F. ASHLEY.
Egg Boiler.

No. 49,062.

Patented Aug. 1, 1865.

WITNESSES:

INVENTOR.

UNITED STATES PATENT OFFICE.

FREDERICK ASHLEY, OF NEW YORK, N. Y.

EGG-BOILER.

Specification forming part of Letters Patent No. 49,062, dated August 1, 1865.

*To all whom it may concern:*

Be it known that I, FREDERICK ASHLEY, of No. 26 Frankfort street, in the city, county, and State of New York, have invented a new and useful Improvement in Egg-Boilers; and I do hereby declare that the following is a full, clear, and exact description thereof, which will enable others skilled in the art to make and use the same, reference being had to the accompanying drawings, forming part of this specification.

It is of the utmost importance for the proper boiling of eggs that they should be allowed to remain in and be subjected to the action of the boiling water used for a certain and stated length of time, which, if varied from, even for a few seconds, more or less, renders the eggs in a certain measure distasteful to most persons, as well as often unfit to be eaten.

The length of time usually allowed for the boiling of eggs is from three and one-half ($3\frac{1}{2}$) minutes to (4) minutes, according to the taste of the persons who are to eat them, the former being considered the most desirable. Heretofore the expiration of the allotted time has been ascertained only by a careful observation of a clock, the many disadvantages and inconviences as well as annoyance of which are so self-evident to all as to render any mention of them herein almost superfluous.

It has long been desired to produce some suitable and simple device by which the expiration of the usual time allowed for the boiling of eggs can be plainly indicated, and therefore the present invention relates to the production of the same; and it consists in combining with the vessel usually employed for boiling eggs, and either attached to its sides or to its cover, or to any suitable portion of the same, or with any of the ordinary forms of egg-holders heretofore used, and arranged in a vertical position thereon, an indicating-glass made upon the principle and of the general form of an "hour-glass," so called. By the running of the sand used from the upper to the lower portion thereof the expiration of the time is noted, the glass being made of the proper size that when the sand has entirely ceased running the boiling-time has expired, and so hung and arranged upon the egg-boiler as to be reversed in position at pleasure.

Figure 1:
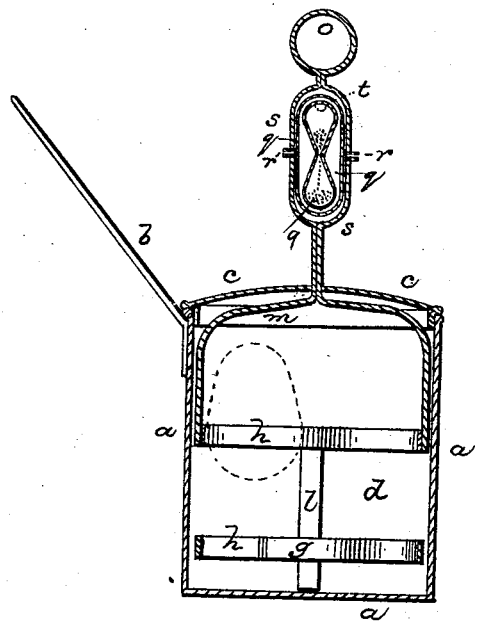
Figure 2:
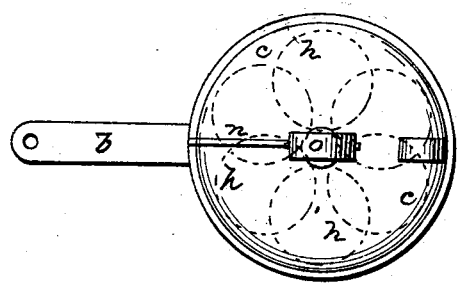

In accompanying plate of drawings my improvement is represented, Figure 1 being a central vertical section of a suitable vessel for boiling eggs, having inserted within it an egg-holder, in the top portion of which an indicating-glass is suspended; and Fig. 2, a plan or top view of the same.

$a\ a$ in the drawings represent a vessel or receptacle, made of any suitable form and material, having a handle, $b$, attached to its side; $c$, its cover; $d$, an egg-holder, consisting of two horizontal plates, $f$ and $g$, having apertures $h\ h$ in the same, in which the eggs are set, as represented in red in Fig. 1. These plates are attached to suitable supports, $l$, on which the egg-holder stands when inserted in the vessel $a$.

$m$ is a frame attached to upper plate, $f$, and extending upward through a slot, $n$, in the cover $c$, with a handle, $o$, at its upper end for convenience in lifting the same; $p$, an indicating-glass made of the form of an hour-glass, and operating upon the principles thereof, having sand $q$ or any other suitable material inserted in it, and made of such a form and size that the time occupied by the sand in passing from one of its chambers to the other shall correspond to that usually allowed for the boiling of eggs. This glass $p$ is inserted within a frame, $q$, hung by trunnion-pins $r\ r$ in a vertical position within the upper portion, $s$, of the handle of the egg-holder, so that when desired it can be reversed in position, a stop, $t$, of the handle holding it in place.

Within the vessel $a$ the boiling water in which the eggs are to be boiled is placed, and then the egg-holder containing the eggs inserted therein, as described, when the cover is put on and the indicating-glass turned so as to bring that portion of it containing the sand uppermost, which then immediately commences and continues to run to the lower chamber of the glass, until it has all passed through, when the allotted time has expired and the egg-holder is immediately removed from the water-receptacle, the eggs having been sufficiently boiled, and as desired.

As I have hereinbefore remarked, the indicating-glass may be secured to various parts of the water-vessel, as well as to the egg-holder used, and also can be so secured thereto as to be readily detached therefrom at pleasure without in the least departing from the principles of the present invention, as hereinbefore stated.

I claim and desire to secure by Letters Patent, as a new article of manufacture—

An egg-boiler having a suitable indicating-glass, arranged and operating substantially as and for the purpose specified.

FREDERICK ASHLEY.

Witnesses:
ALBERT W. BROWN,
M. M. LIVINGSTON.